United States Patent [19]
Turner

[11] Patent Number: 5,870,877
[45] Date of Patent: *Feb. 16, 1999

[54] TRUSS STRUCTURE FOR A UTILITY POLE

[76] Inventor: Daryl Turner, 10572 E. Palamino Rd., Phoenix, Ariz. 85258

[ * ] Notice: This patent issued on a continued prosecution application filed under 37 CFR 1.53(d), and is subject to the twenty year patent term provisions of 35 U.S.C. 154(a)(2).

[21] Appl. No.: 782,329

[22] Filed: Jan. 13, 1997

Related U.S. Application Data

[63] Continuation of Ser. No. 782,329, Jan. 13, 1997, abandoned, which is a continuation-in-part of Ser. No. 743,388, Nov. 4, 1996, Pat. No. 5,809,734, which is a continuation of Ser. No. 351,507, Dec. 7, 1994, abandoned.

[51] Int. Cl.⁶ ..................................................... E04C 3/30
[52] U.S. Cl. ................ 52/736.3; 52/309.1; 52/309.9; 52/726.4; 52/731.1; 52/736.2; 52/733.1
[58] Field of Search ............................... 52/309.9, 726.4, 52/731.1, 736.1, 736.3, 736.2, 736.4, 738.1, 309.1; 249/160, 18, 48, 51; 264/171.23, 173.17, 137; 156/149, 148

[56] References Cited

U.S. PATENT DOCUMENTS

| | | |
|---|---|---|
| 213,715 | 3/1879 | Von Mengden . |
| 224,775 | 2/1880 | Fryer, Jr. . |
| 666,146 | 1/1901 | Lanz . |
| 1,445,938 | 2/1923 | Farrington . |
| 2,109,508 | 3/1938 | Schmittutz ................... 52/736.4 X |
| 2,870,793 | 1/1959 | Bailey . |
| 3,177,667 | 4/1965 | Liddell ....................... 52/736.4 X |
| 3,270,480 | 9/1966 | Beecker . |
| 3,378,978 | 4/1968 | Durand . |
| 3,570,376 | 3/1971 | Overton et al. . |
| 3,574,104 | 4/1971 | Medler . |
| 3,726,360 | 4/1973 | Price et al. . |
| 3,813,098 | 5/1974 | Fischer et al. ................. 52/738.1 X |
| 3,813,837 | 6/1974 | McClain et al. . |
| 3,970,401 | 7/1976 | Lubeck . |
| 4,142,343 | 3/1979 | Trafton . |
| 4,144,111 | 3/1979 | Schaerer ..................... 264/171.23 X |
| 4,155,970 | 5/1979 | Cassell ......................... 156/149 X |
| 4,194,338 | 3/1980 | Trafton . |
| 4,202,520 | 5/1980 | Loos . |
| 4,211,692 | 7/1980 | Barius et al. ................. 264/171.23 X |
| 4,312,162 | 1/1982 | Medney . |
| 4,347,090 | 8/1982 | Anderson ............................ 156/149 |
| 4,458,455 | 7/1984 | Tollstoff de Voss . |
| 4,488,844 | 12/1984 | Baubles . |
| 4,583,359 | 4/1986 | Staeger . |
| 4,702,057 | 10/1987 | Phillips . |
| 4,738,058 | 4/1988 | Svensson . |
| 4,751,804 | 6/1988 | Cazaly . |
| 4,769,967 | 9/1988 | Bourrieres ........................ 52/736.3 |
| 4,803,819 | 2/1989 | Kelsey . |

(List continued on next page.)

FOREIGN PATENT DOCUMENTS

| | | |
|---|---|---|
| 774805 | 1/1968 | Canada . |
| 2436547 | 4/1976 | Germany . |

*Primary Examiner*—Christopher Kent
*Assistant Examiner*—Yvonne Horton-Richardson
*Attorney, Agent, or Firm*—Blakely Sokoloff Taylor & Zafman

[57] ABSTRACT

A utility pole constructed from a pultruded composite material. The composite material includes a tensioned woven sock that is impregnated with a resin by a pultrusion process. The pole has a triangular shaped first composite member which has an inner channel defined by three walls that intersect at three corresponding apexes. Within the first composite member is a second triangular shaped composite member which also has three walls that intersect at three corresponding apexes. The apexes of the second member intersect with the walls of the first member such that the second member walls extend across the inner channel. The extension of the second member walls across the inner channel provides structural support for the walls of the first member and creates a relatively rigid composite utility pole.

9 Claims, 10 Drawing Sheets

U.S. PATENT DOCUMENTS

| | | | |
|---|---|---|---|
| 4,846,908 | 7/1989 | Aldrich et al. | 156/149 X |
| 4,907,624 | 3/1990 | Jonasson | 156/149 X |
| 4,918,883 | 4/1990 | Owen et al. | 52/736.4 X |
| 4,939,002 | 7/1990 | Hilagos | 264/171.23 X |
| 5,175,971 | 1/1993 | McCombs . | |
| 5,218,810 | 6/1993 | Isley, Jr. | 52/736.3 X |
| 5,222,344 | 6/1993 | Johnson . | |
| 5,228,251 | 7/1993 | Frigon | 52/632 X |
| 5,250,132 | 10/1993 | Capp et al. | 52/309.1 X |
| 5,324,377 | 6/1994 | Davies | 264/173.17 X |
| 5,339,594 | 8/1994 | Ventura-Berti . | |
| 5,374,385 | 12/1994 | Binse et al. | 264/171.23 X |
| 5,379,566 | 1/1995 | Schworer | 52/632 |
| 5,513,477 | 5/1996 | Farber | 52/736.3 X |
| 5,540,870 | 7/1996 | Quigley | 264/137 X |
| 5,546,707 | 8/1996 | Caruso | 52/736.3 X |
| 5,549,947 | 8/1996 | Quigley et al. | 156/149 X |
| 5,555,696 | 9/1996 | Morrison, III et al. | 52/736.3 X |

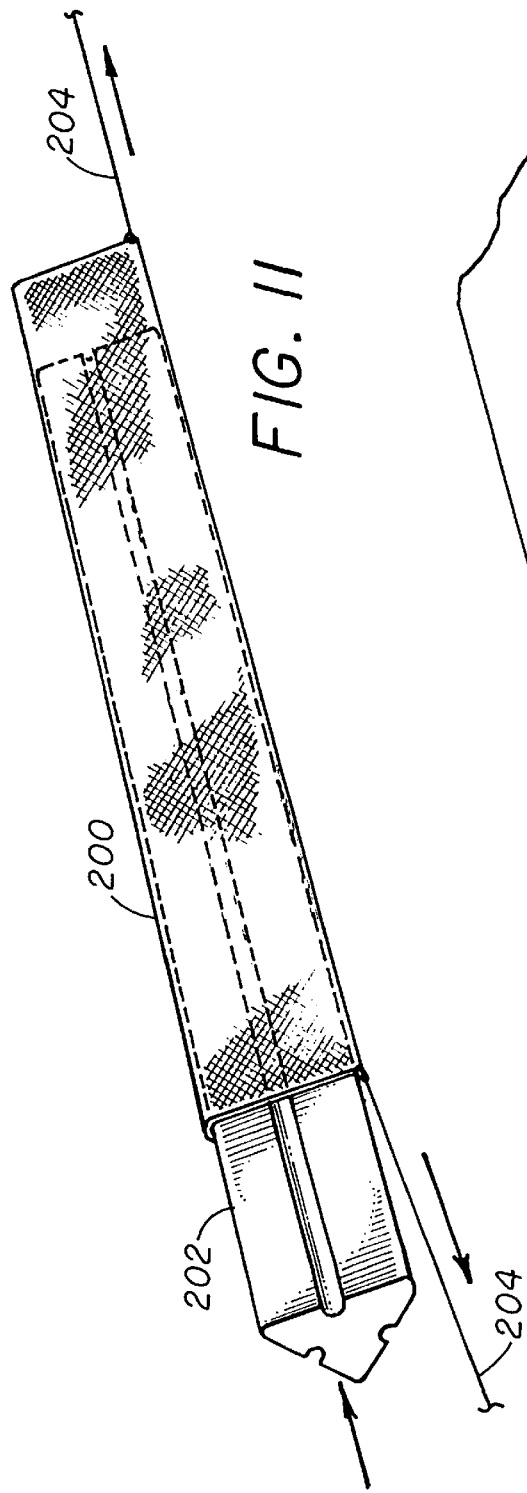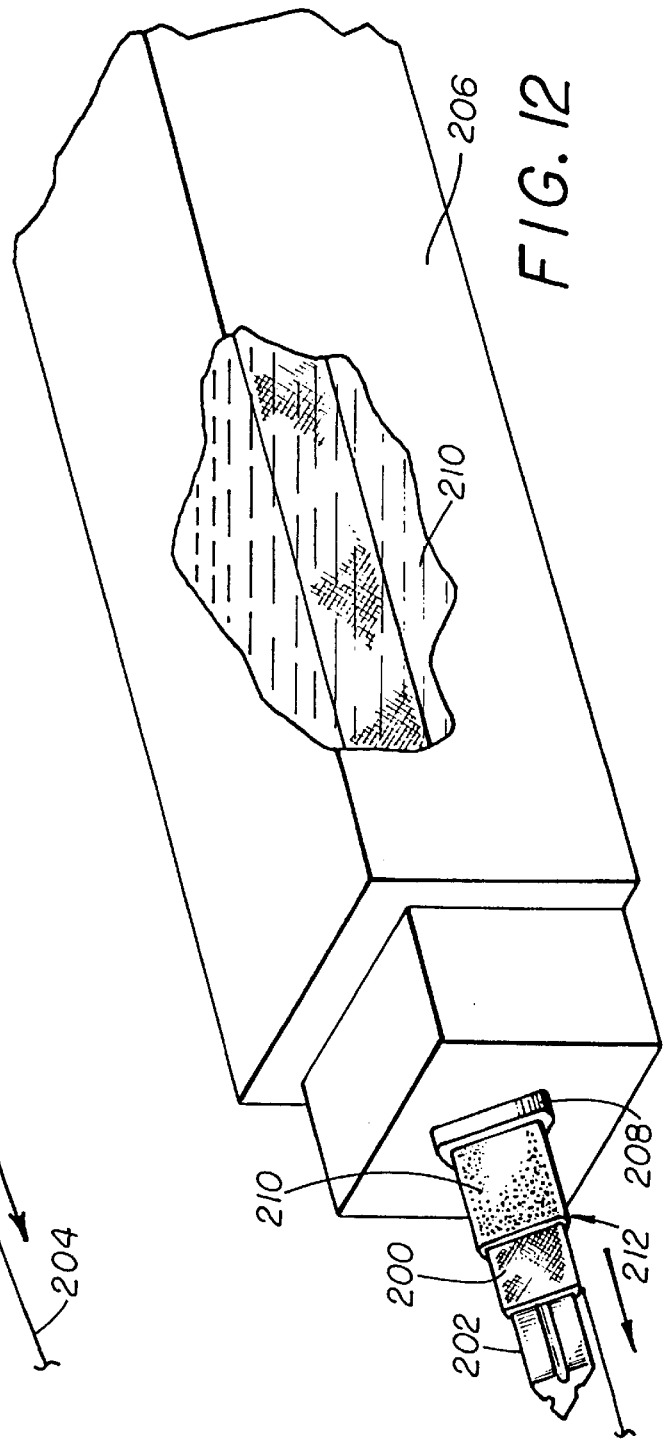

TRUSS STRUCTURE FOR A UTILITY POLE

This application is a continuation of application Ser. No. 08/782,329, filed Jan. 13, 1997, now abandoned, which is a continuation-in-part application of application Ser. No. 08/743,388, filed Nov. 4, 1996, now U.S. Pat. No. 5,809,734, which is a continuation of Ser. No. 351,507 filed Dec. 7, 1994, abandoned.

BACKGROUND OF THE INVENTION

1. Field of the Invention

The present invention relates to a utility pole constructed from a composite material.

2. Description of Related Art

Utility poles are typically constructed from wooden poles that are anchored into the ground. The utility poles will typically have arms that support a number of electrical power lines. The continuous exposure to harsh environmental conditions can cause the wood poles to rot and decay. To prevent rotting, the wood is sometimes treated with a carbon base material such as tar. It has been found that most conventional wood treating material is harmful to the environment. Additionally, it has been found that a significant amount of electrical current drains to the ground, thereby reducing the energy efficiency of the power system.

Metal poles have been installed to increase the life of the utility poles. Metal poles are highly conductive and generally create an unsafe environment for the utility personnel that maintain and repair the pole. Additionally, both metal and wooden poles are relatively heavy, typically requiring a crane to lift and install the poles.

U.S. Pat. No. 5,175,971 issued to McCombs discloses a hollow utility pole that is constructed from a composite material such as a resin impregnated fiber glass. The McCombs pole has a hexagonally shaped liner located within a hexagonally shaped primary pole. The outer primary pole has a plurality of dove tail grooves that allow arm attachments to be mounted to the pole. Additionally, the grooves allow personnel to climb the pole. The dove tail grooves create a number of rounded fingers located adjacent to thin neck portions of the primary pole. It has been found that when forming the composite, the resin and glass fibers do not evenly flow into the neck and finger portions of the primary pole. The uneven resin flow and glass fiber distribution can reduce the structural integrity of the pole. The rounded finger portions also add thickness and weight to a utility pole that can be 40 feet in length.

The hollow McComb utility pole has relatively low bending and torsional stiffnesses. The relatively low stiffness must be compensated for by a thicker wall. Increasing the thickness of the wall increases the weight of the pole. It would be desirable to provide a relatively strong, lightweight utility pole which can be efficiently constructed from a composite material.

SUMMARY OF THE INVENTION

The present invention is a utility pole constructed from a pultruded composite material. The composite material includes a tensioned wooven sock that is impregnated with a resin by a pultrusion process. The pole has a triangular shaped first composite member which has an inner channel defined by three walls that intersect at three corresponding apexes. Within the first composite member is a second triangular shaped composite member which also has three walls that intersect at three corresponding apexes. The apexes of the second member intersect with the walls of the first member such that the second member walls extend across the inner channel. The extension of the second member walls across the inner channel provides structural support for the walls of the first member and creates a relatively rigid composite utility pole.

BRIEF DESCRIPTION OF THE DRAWINGS

The objects and advantages of the present invention will become more readily apparent to those ordinarily skilled in the art after reviewing the following detailed description and accompanying drawings, wherein:

FIG. 11 is a perspective view showing an inner mold being inserted into a wooven sock;

FIG. 12 is a perspective view showing the inner mold and wooven sock being pulled through an outer mold.

DETAILED DESCRIPTION OF THE INVENTION

Figure 1:
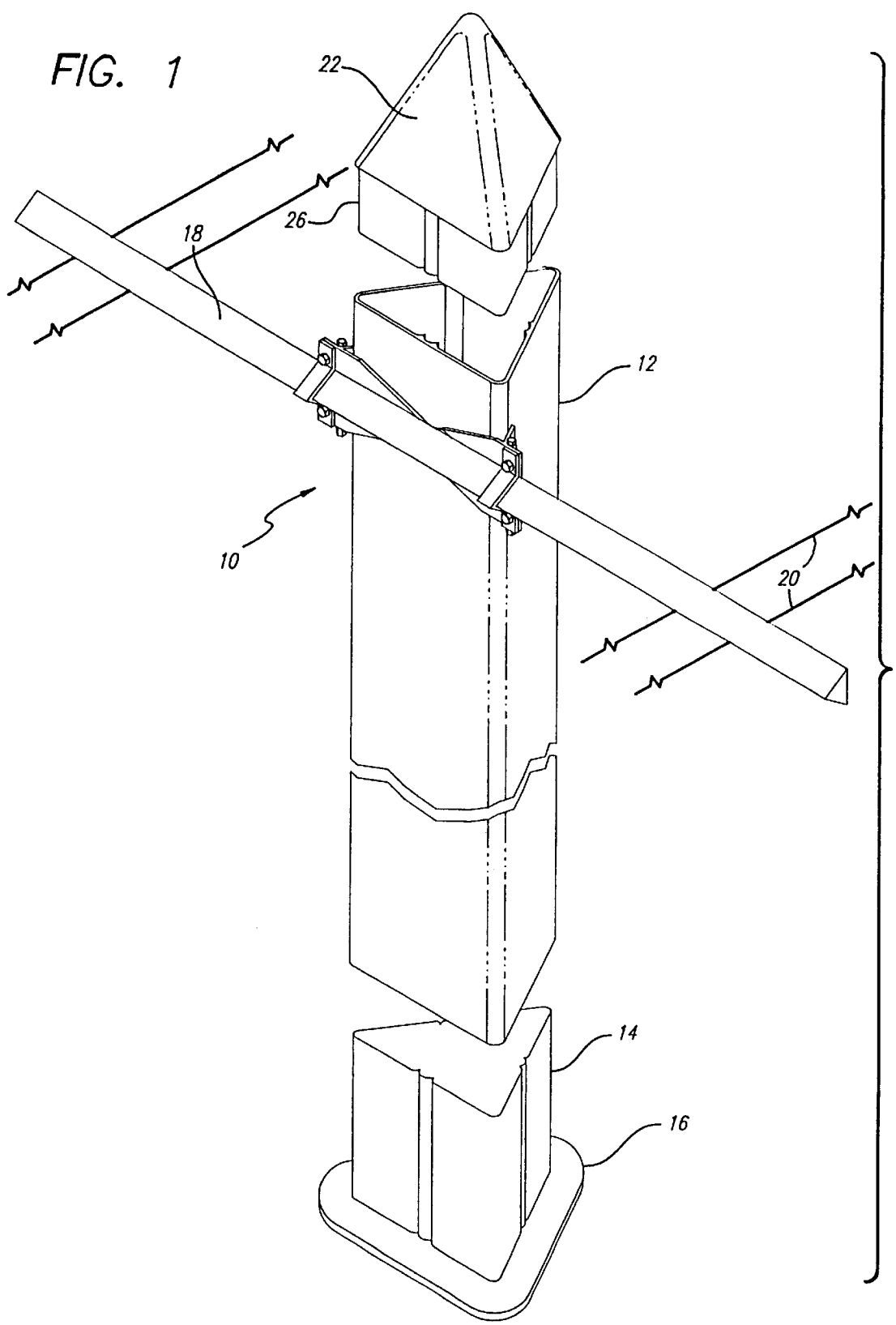
FIG. 1 is a perspective view of a telephone pole of the present invention.

Referring to the drawings more particularly by reference numbers, FIG. 1 shows a utility pole assembly 10 of the present invention. The components of the pole assembly 10 are constructed from a composite material such as a glass reinforced resin. The outer surface of the composite material is typically smooth so that animals do not climb the pole. Additionally, the composite material will not carry bacteria or create slivers which can be harmful to the utility personnel that maintain and repair the pole. The composite material is also a dielectric which significantly reduces the amount of electrical current that drains to the ground, thereby increasing the energy efficiency of the power system. The composite pole assembly is generally immune to corrosive ambient conditions and is not susceptible to being struck by lightening. The composite material may be wrapped with a cloth that contains ultraviolet additives which provide protection to solar energy.

The assembly 10 includes a pole 12 that is attached to a sleeve 14. The sleeve 14 may have a base 16 that is buried into the ground to anchor the pole 12. The sleeve 14 preferably has an inner cavity that has the same profile as the shape of the pole 12, so that the pole 12 can be slipped into the sleeve 14. The assembly 10 typically includes arms 18 that support electrical wires 20. The assembly 10 may also have a top 22. The top 22 may be conical in shape to prevent birds from perching on the pole. The top 22 may have an inner lip 26 that is inserted into the pole 12.

Figure 2:
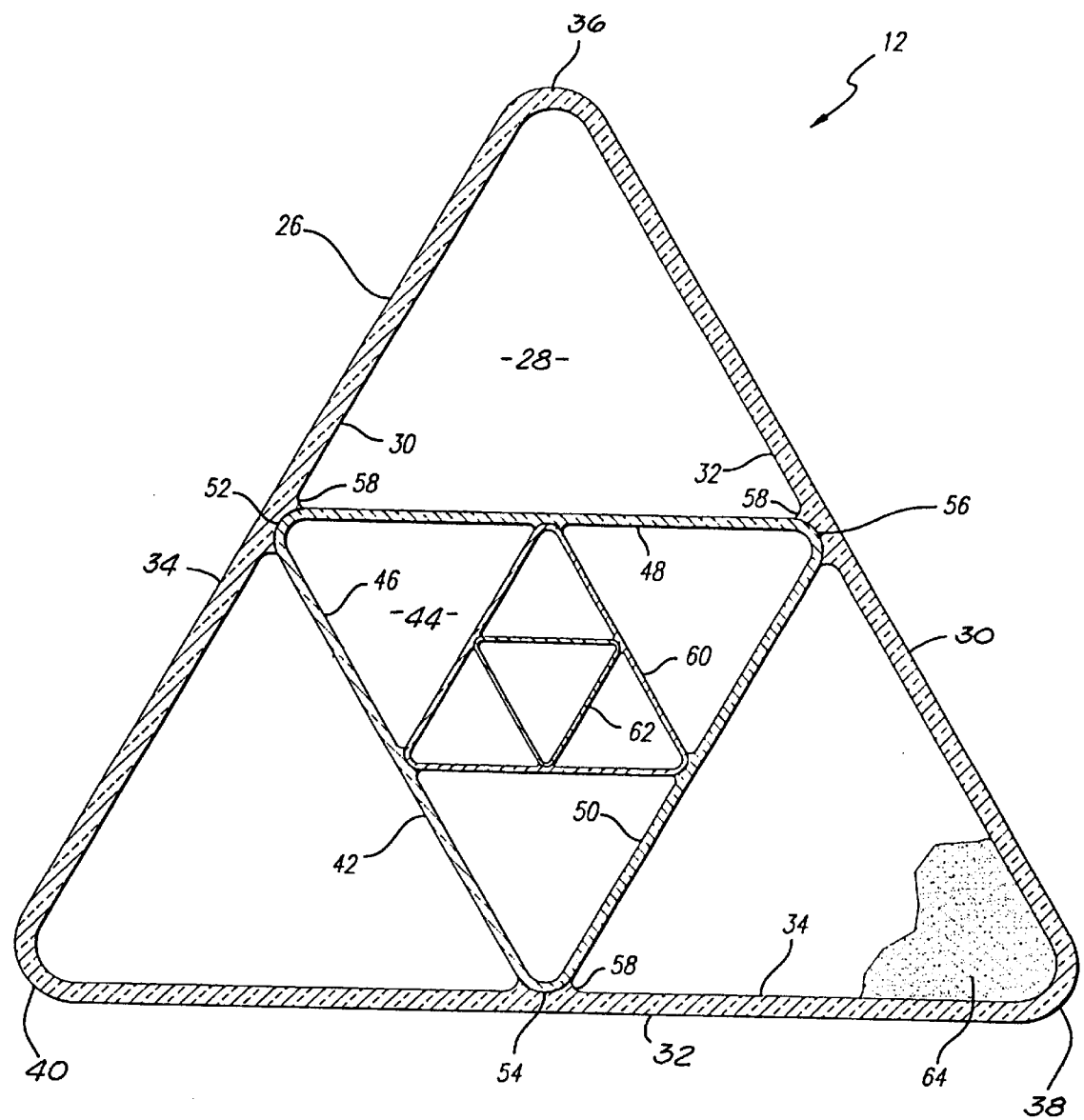
FIG. 2 is a cross-sectional view of the telephone pole.

FIG. 2 shows a preferred embodiment of the pole 12. The pole 12 has a first triangular shaped composite member 26 that has an inner channel 28. The inner channel 28 is defined by three walls 30–34 that intersect at corresponding apexes 36–40. Within the inner channel 28 is a second triangular shaped composite member 42. The second member 42 also has an inner channel 44 defined by three walls 46–50 that intersect at three corresponding apexes 52–56. The apexes 52–56 of the second member 42 intersect with the walls 30–34 of the first member 26 so that the walls 46–50 extend across the inner channel 28. In the preferred embodiment, the apexes 52–56 intersect with the midpoint of the walls 30–34. The walls 30–34 may have cups 58 that seat the second member 42 within the inner channel 28.

The walls 46–50 of the second member 42 provide structural support for the first member 26 and provide a relatively rigid composite utility pole. The stiffness of the pole allows the composite members to be constructed with a thinner wall than a pole without the cross-support. The thinner walls creates a relatively light weight pole. The stiffness of the pole can be increased by nesting third 60 and fourth 62 triangular shaped composite members within the second composite member 42. The inner spaces of the composite members can be filled with a foam 64 that further increases the structural integrity of the pole. The components of the assembly can be bonded together by a cured filmed, adhesive or other means of attaching together the various parts of the pole.

Figure 3A:
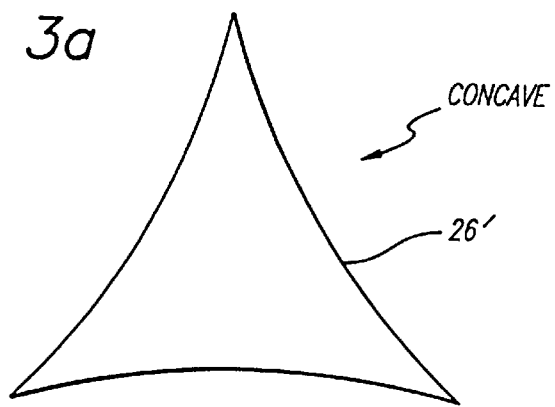
FIGS. 3a, 3b, 3c and 3d are alternate embodiments of the telephone pole.
Figure 3B:
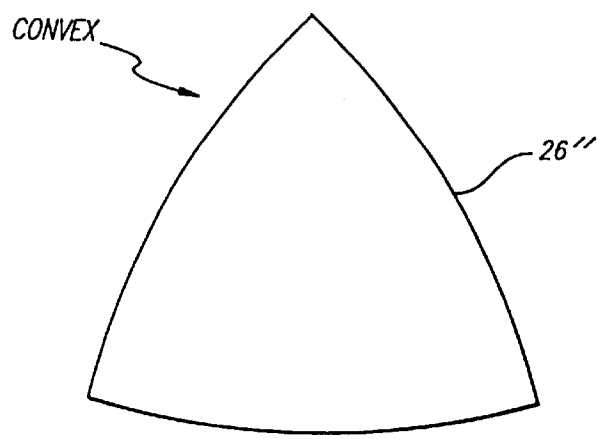
Figure 3C:
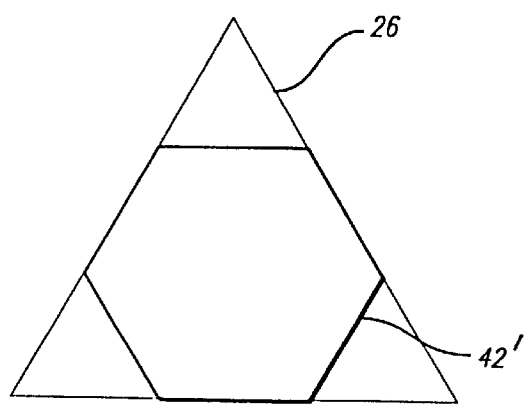
Figure 3D:
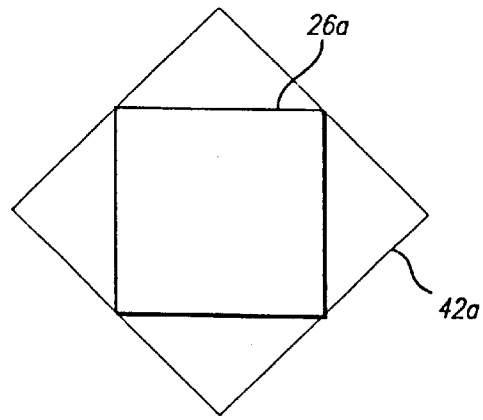

FIGS. 3a and 3b show alternate embodiments of the members, wherein the first members 26' and 26" have concave and convex shaped walls, respectively. The concave/convex walls provide a more aerodynamic pole that is less susceptible to wind shear. FIG. 3c shows another alternate embodiment, wherein the second member 42' has a hexagonal cross-section. FIG. 3d shows yet another alternate embodiment that contains a pair of rectangular shaped members 26a and 42a.

Figure 4A:
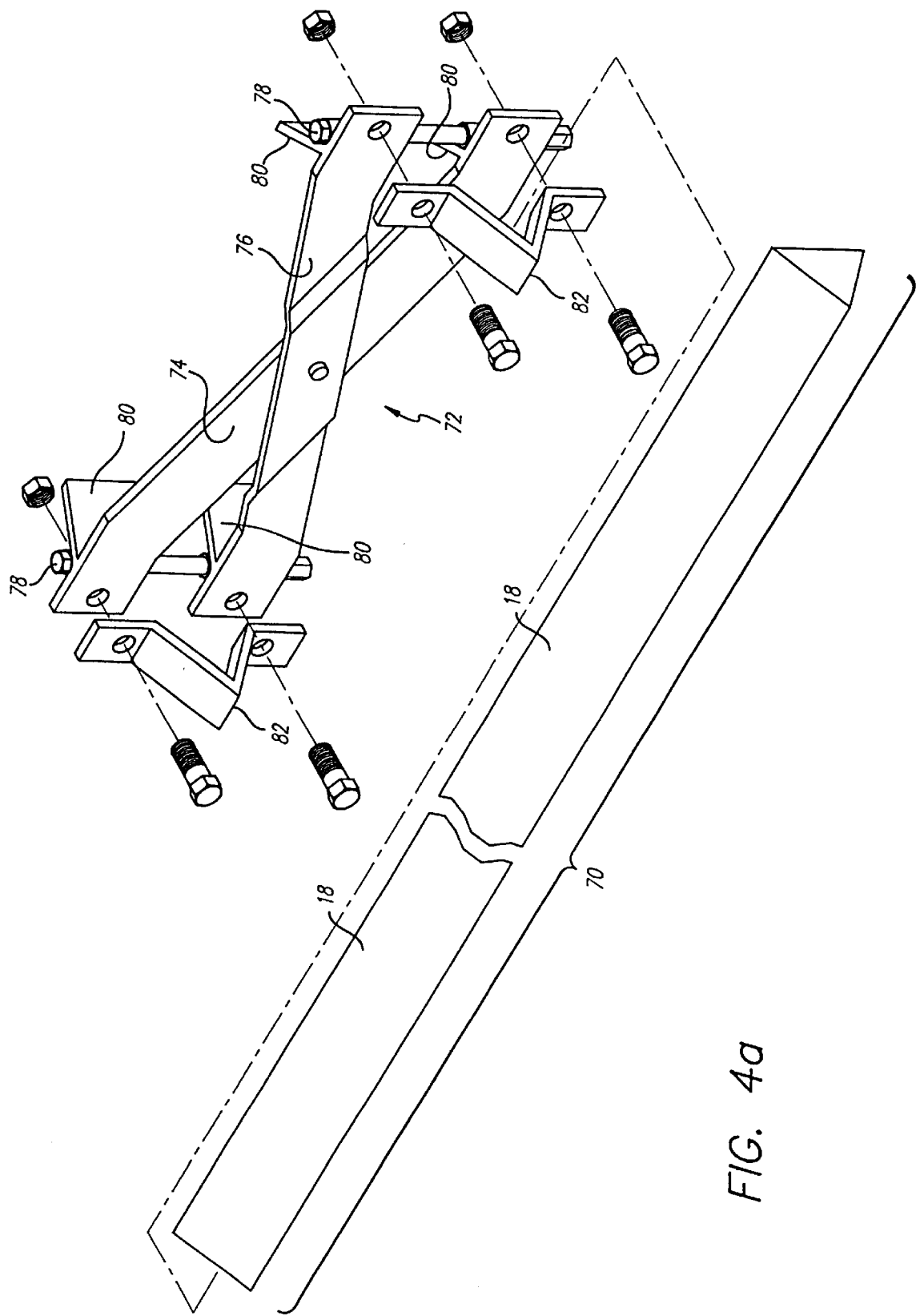
FIG. 4 is an exploded view of an arm attachment assembly.
FIG. 4b is a perspective view of an arm mounting bracket.
Figure 4B:
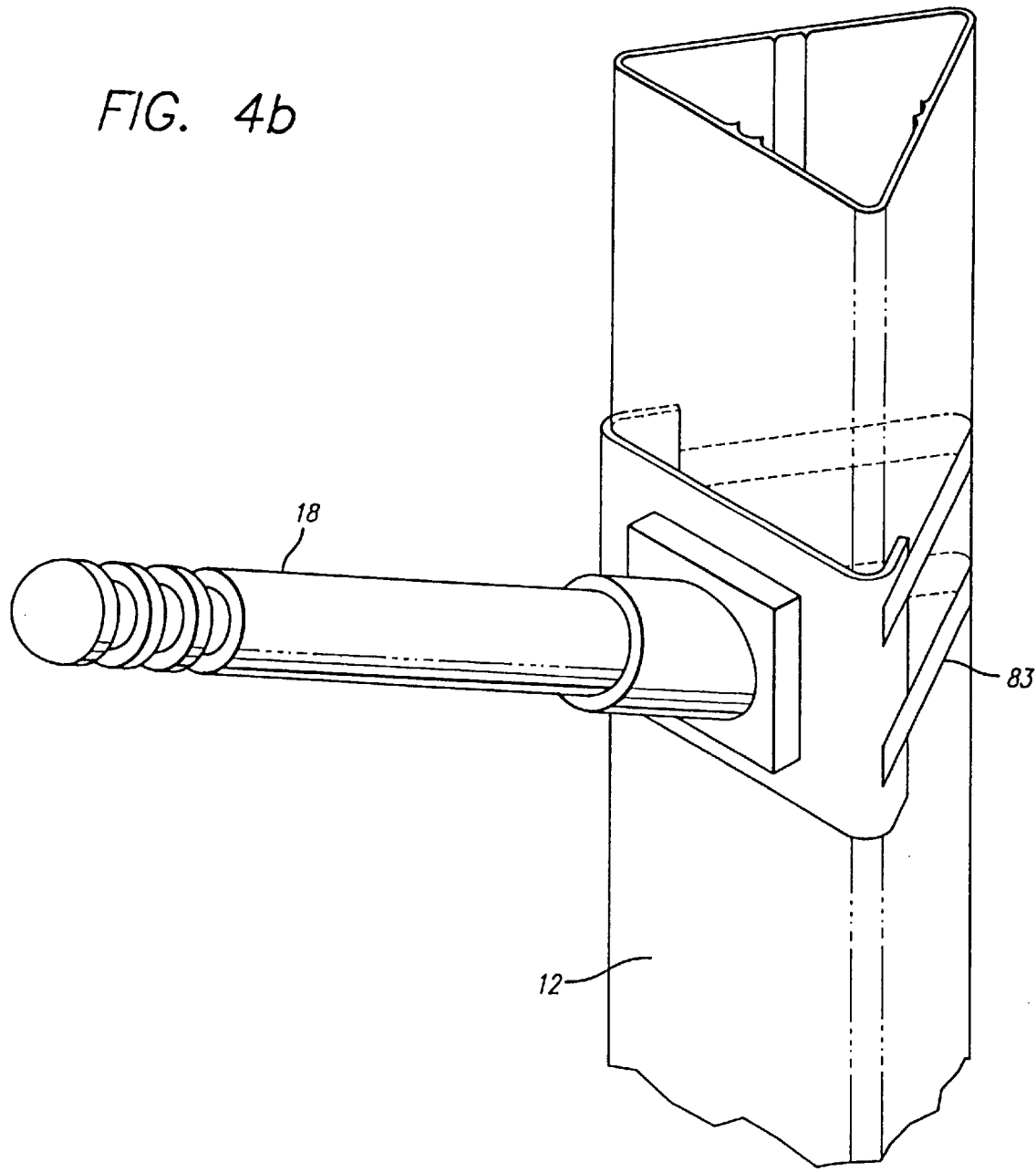

FIG. 4 shows an arm attachment assembly 70 that can be attached to the pole 12. The assembly includes an attachment member 72 which has two crossed beams 74 and 76. The attachment member 72 is mounted to one of the pole walls by a fastener 78. The attachment member 72 has a number of leg portions 80 that are adjacent to the walls of the pole and prevent rotation of the beams 74 and 76 relative to the pole 12. An arm 18 is clamped to the attachment member 72 by a pair of clamps 82 that are fastened to the beams 74 and 76. The attachment member 72, arm 18 and clamps 82 can all be constructed from a composite material. FIG. 4b shows an arm mounting bracket 83 is strapped to the pole 12 and supports an arm 18 which extends from the pole 12 at an angle.

Figure 5:
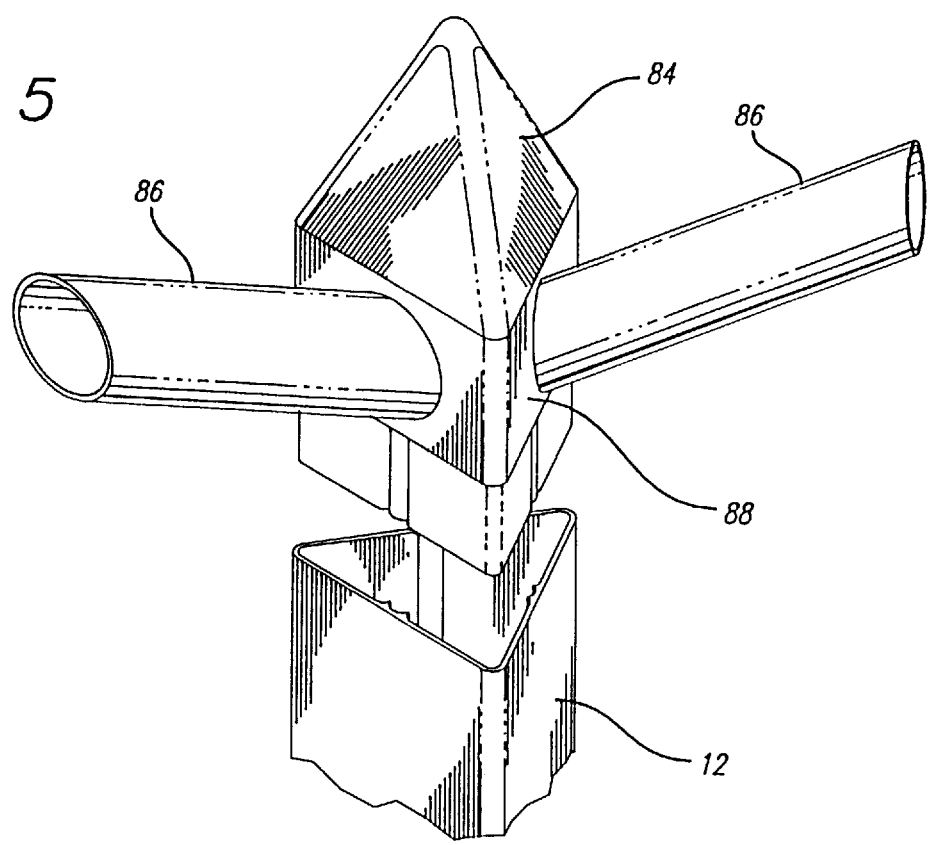
FIG. 5 is an exploded view of an arm that is attached to a top portion of the telephone pole.

FIG. 5 shows an alternate pole assembly which has a top 84 that is inserted into the pole 12 and which has a pair of arms 86 that extend from a base portion 88 and support the electrical wires.

Figure 6:
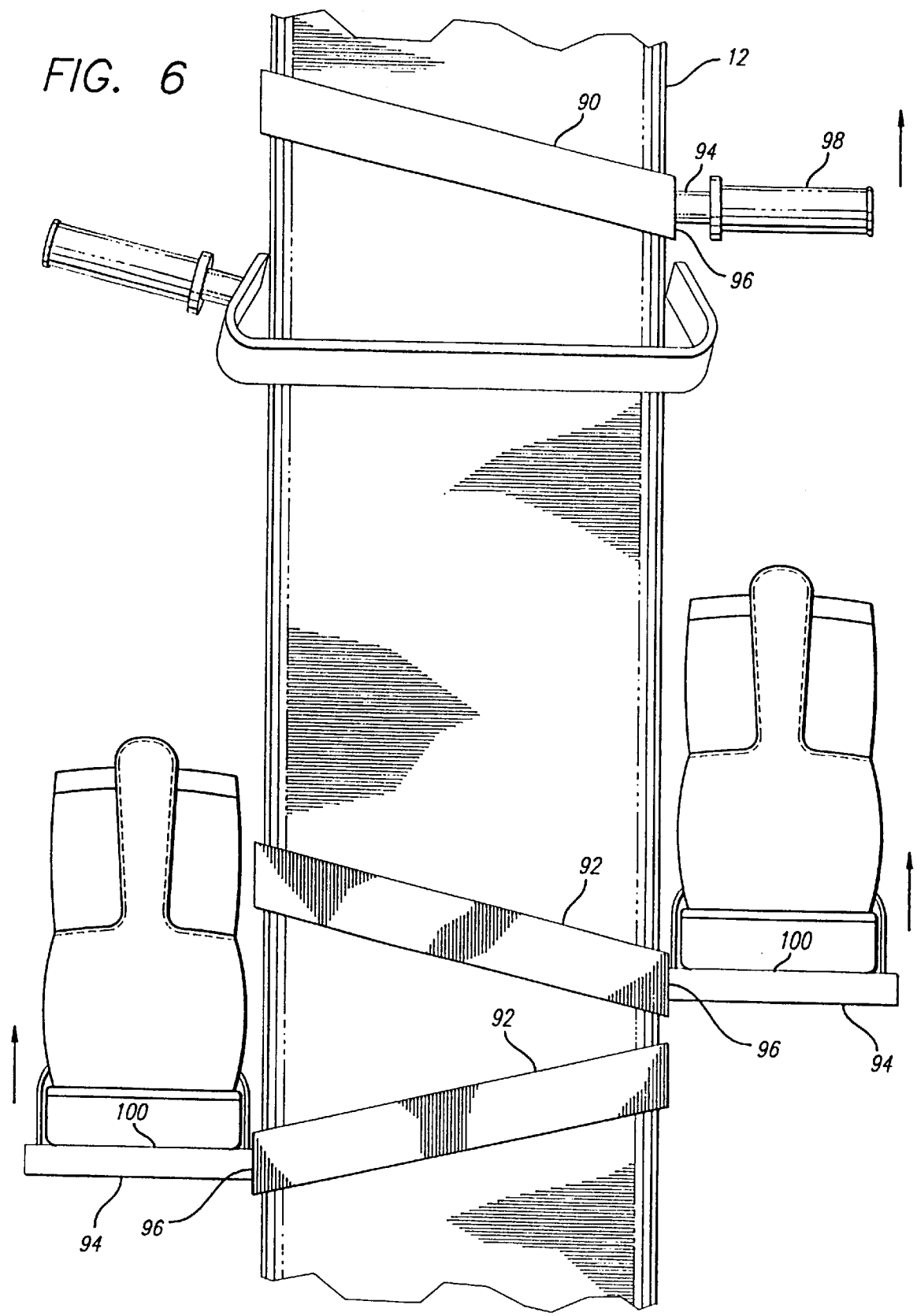
FIG. 6 is a perspective view showing a hand climbing device and a foot climbing device coupled to the utility pole.

FIG. 6 shows a hand climbing device 90 and a foot climbing device 92 that can be used by utility personnel to climb the pole 12. The climber typically utilizes separate hand 90 and foot 92 devices for each hand and foot, respectively. Each device has a pair of leg portions 94 that extend from a base portion 96. The dimensions and stiffnesses of the devices are such that the leg portions 94 will normally clamp the pole 12 and maintain the position of the climber. To release and move the hand device 90, the climber can pull on a handle 98 to move the adjacent leg portion 94 away from the pole wall. Likewise, the foot device 92 can be moved relative to the pole by pulling on a foot platform 100 that moves the adjacent leg portion away from the pole and releases the device from the pole walls. The devices 90 and 92 have enough resiliency to spring back and clamp the pole 12 when the hand/platform is released by the utility personnel. The climber can scale the pole by continuously pulling, moving and releasing the devices 90 and 92.

Figure 7:
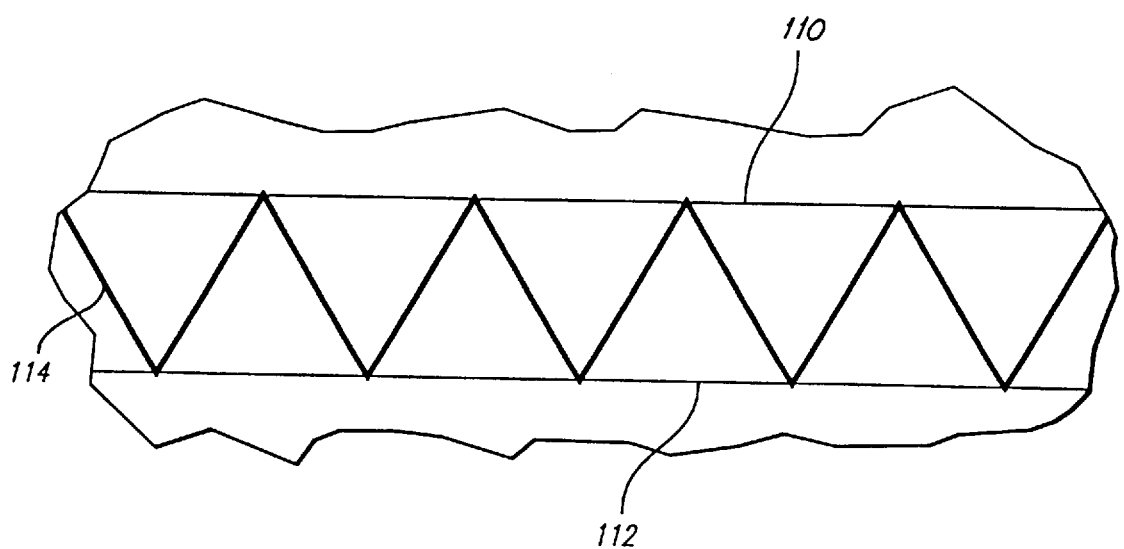
FIG. 7 is a top view showing a weave of the utility pole composite material.

FIG. 7 shows a preferred embodiment for constructing the composite material. The composite may have a first string 110 of reinforcing material that is essentially parallel with a second string 112 of reinforcing material. A third string 114 of reinforcing material is then weaved between the two strings in a pattern that creates a plurality of triangles. The third string 114 provides structural support for the first 110 and second 112 strings. The resin impregnated reinforcing strings are typically a fiberglass or other conventional composite reinforcing material. The reinforcing material is typically impregnated with a resin. The composite is typically extruded into the shape of a pole component.

Figure 8:
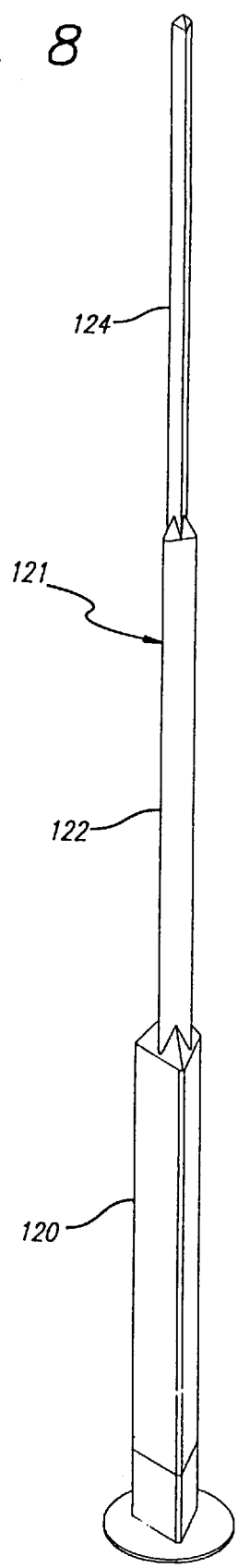
FIG. 8 is a perspective view of a tiered pole.
Figure 9:
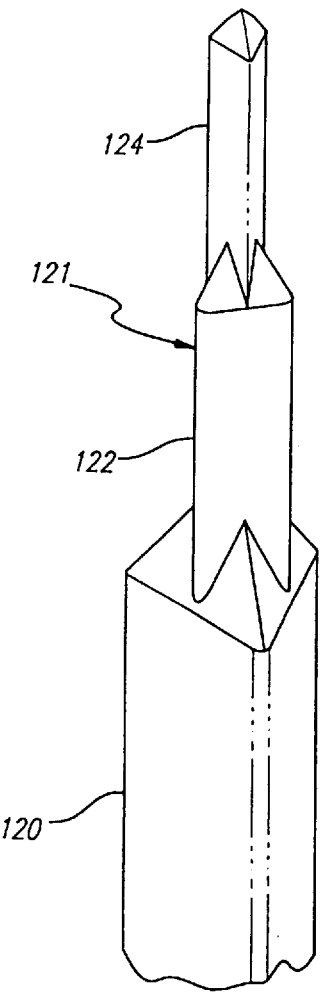
FIG. 9 is a perspective view showing the tiers of the pole.

FIGS. 8 and 9 show an alternate embodiment of a tiered pole 121. Such a pole 121 can be constructed to be 120 feet long, thereby providing a single high extension utility unit. The pole 121 is constructed into three tiered sections 120, 122 and 124 with descending cross-sectional areas. Tiering the pole reduces the weight without compromising the structural integrity of the pole.

Figure 10:
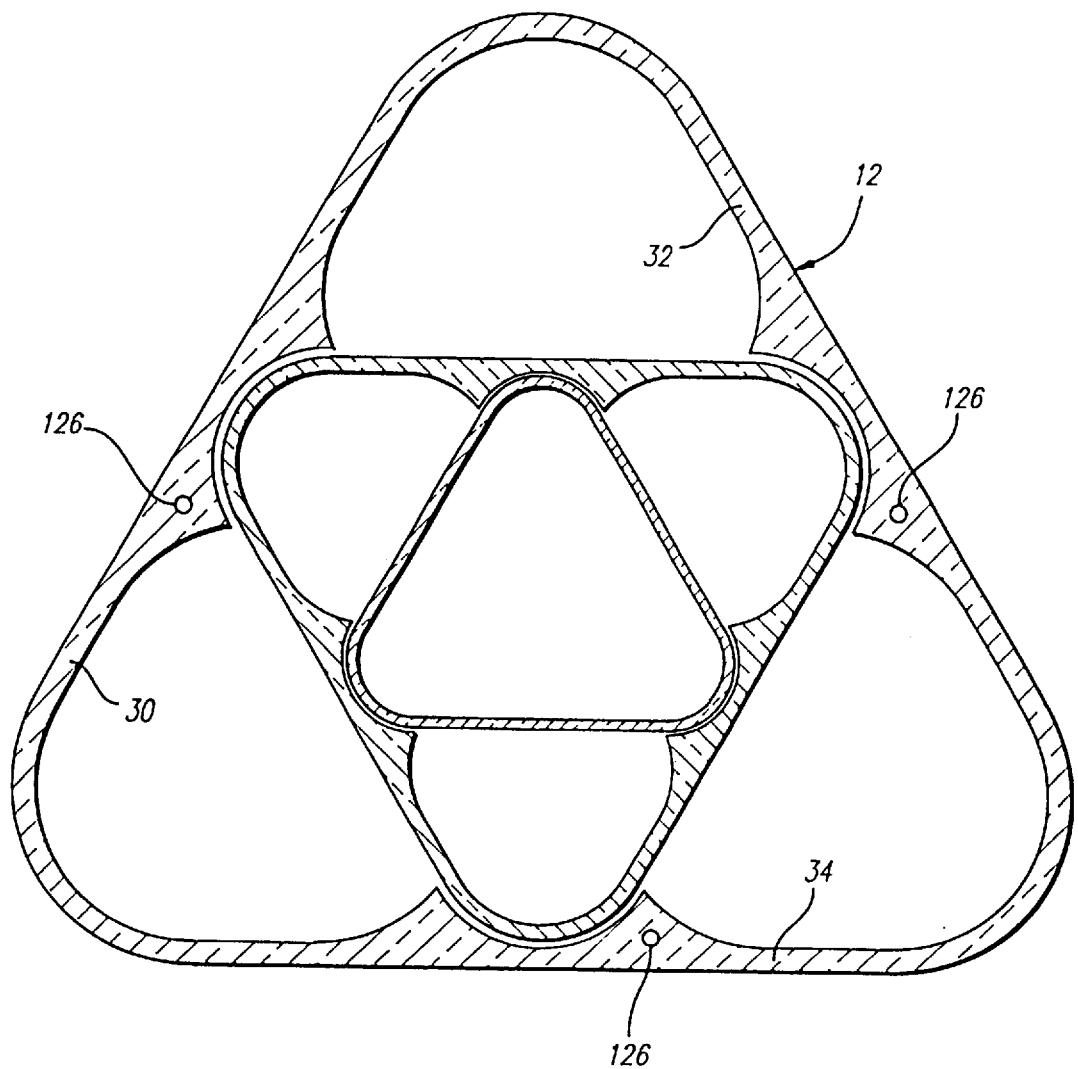
FIG. 10 is a cross-sectional view of a pole with fiber optic elements embedded within the walls.

FIG. 10 shows an alternate embodiment of a pole 12 with fiber optic cables 126 that are embedded within the walls 30–34. The fiber optic cables typically run along the length of the pole.

FIGS. 11 and 12 show a preferred method for constructing a utility pole with a pultrusion process. A sock 200 is initially constructed from a wooven fiber such as fiberglass. An inner mold 202 is then placed into the sock 200. Each end of the sock 200 has a rope 204, that is preferably constructed from KEVLAR. The rope 204 is pulled to expand the sock 200 and place the fibers in tension.

The inner mold 202 and tensioned sock 200 are dipped in a resin bath 206 and pulled through an outer die 208 by a pultrusion machine. The inner 202 and outer 208 molds are preferably heated to maintain the viscosity of the resin. The pultrusion process impregnates the resin 210 into the tensioned wooven sock 200. The tensioned resin impregnated sock hardens to create a pultruded member 212. The pretensioning of the sock 200 increases the stiffness of the member 212. The pultruded member 212 is subsequently cut into individual utility pole pieces which are then assembled to create utility poles.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A utility pole, comprising:

a first member which has an inner channel defined by at least one wall which has a radially shaped cup; and, a second member that fits within said inner channel, said second member having at least two walls that extend across said inner channel and are attached to said radially shaped cup.

2. The utility pole as recited in claim 1, wherein said first and second members are constructed from a composite material.

3. The utility pole as recited in claim 1, wherein said inner channel is filled with a foam material.

4. The utility pole as recited in claim 1, wherein said inner channel of said first member is defined by three walls that each have a corresponding cup, and said second member has three walls that extend across said inner channel and are attached to said cups.

5. The utility pole as recited in claim 4, wherein said cups are located at a midpoint of said first member walls.

6. The utility pole as recited in claim 4, wherein said walls of said first member are concave.

7. The utility pole as recited in claim 4, wherein said walls of said first member are convex.

8. The utility pole as recited in claim 1, wherein said second member is a top that has a pair of arms that extend from a base member.

9. The utility pole as recited in claim 1, further comprising an arm attachment mounted to said first member.

\* \* \* \* \*